US010468020B2

(12) United States Patent
Pandey et al.

(10) Patent No.: US 10,468,020 B2
(45) Date of Patent: Nov. 5, 2019

(54) SYSTEMS AND METHODS FOR REMOVING INTERFERENCE FOR AUDIO PATTERN RECOGNITION

(71) Applicant: Cypress Semiconductor Corporation, San Jose, CA (US)

(72) Inventors: Ashutosh Pandey, Irvine, CA (US); Robert Zopf, Rancho Santa Margarita, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/716,173

(22) Filed: Sep. 26, 2017

(65) Prior Publication Data

US 2018/0350357 A1 Dec. 6, 2018

Related U.S. Application Data

(60) Provisional application No. 62/515,712, filed on Jun. 6, 2017.

(51) Int. Cl.
*G10L 21/0208* (2013.01)
*G10L 15/20* (2006.01)
(Continued)

(52) U.S. Cl.
CPC .............. *G10L 15/20* (2013.01); *G10L 15/22* (2013.01); *G10L 15/30* (2013.01); *G10L 19/005* (2013.01); *G10L 21/0232* (2013.01); *G10L 25/84* (2013.01); *G10L 15/00* (2013.01); *G10L 21/0208* (2013.01); *G10L 2015/223* (2013.01); *G10L 2021/02082* (2013.01); *G10L 2021/02166* (2013.01); *G10L 2025/783* (2013.01); *H04M 9/082* (2013.01)

(58) Field of Classification Search
CPC ....... G10L 21/0208; G10L 2021/02165; G10L 15/20; G10L 2021/02082; H04M 9/082
See application file for complete search history.

(56) References Cited

U.S. PATENT DOCUMENTS

| 5,323,458 A * | 6/1994 | Park ..................... H04M 9/082 |
| | | 379/391 |
| 5,912,966 A * | 6/1999 | Ho .......................... H04B 3/23 |
| | | 370/289 |

(Continued)

OTHER PUBLICATIONS

Obaid, Thoraya, "ZigBee Based Voice Controlled Wireless Smart Home System," International Journal of Wireless & Mobile Networks, vol. 6, No. 1, Feb. 2014, pp. 47-59; 12 pages.

(Continued)

*Primary Examiner* — Jialong He

(57) ABSTRACT

An example apparatus provides an input signal based on sound waves received by one or more microphones. The input signal includes a voice command component and one or more interference components. The apparatus receives audio data over one or more computer networks and the audio data corresponds to the one or more interference components. The apparatus uses the audio data to remove a portion of the one or more interference components from the input signal to generate an output signal, and provides the output signal, as an estimate of the voice command component, for speech recognition.

14 Claims, 9 Drawing Sheets

(51) Int. Cl.
   *G10L 25/84*    (2013.01)
   *G10L 21/0232*  (2013.01)
   *G10L 19/005*   (2013.01)
   *G10L 15/30*    (2013.01)
   *G10L 15/22*    (2006.01)
   *G10L 21/0216*  (2013.01)
   *H04M 9/08*     (2006.01)
   *G10L 15/00*    (2013.01)
   *G10L 25/78*    (2013.01)

(56) References Cited

U.S. PATENT DOCUMENTS

| | | | | |
|---|---|---|---|---|
| 6,738,482 B1* | 5/2004 | Jaber | H04R 1/406 | 379/406.01 |
| 6,937,980 B2* | 8/2005 | Krasny | G10L 15/20 | 704/231 |
| 6,990,083 B1* | 1/2006 | Reina | H04B 3/23 | 370/286 |
| 7,003,095 B2* | 2/2006 | Nakai | H04M 9/082 | 379/406.01 |
| 7,003,099 B1* | 2/2006 | Zhang | H04M 9/082 | 379/388.02 |
| 7,054,451 B2* | 5/2006 | Janse | H04R 3/02 | 381/66 |
| 7,174,022 B1* | 2/2007 | Zhang | H04R 3/005 | 381/92 |
| 8,019,091 B2* | 9/2011 | Burnett | H04R 1/46 | 381/71.8 |
| 8,781,137 B1* | 7/2014 | Goodwin | H04R 3/005 | 381/94.1 |
| 9,286,883 B1 | 3/2016 | Ayrapetian et al. | | |
| 9,305,554 B2 | 4/2016 | Jagatheesan et al. | | |
| 9,307,318 B2 | 4/2016 | Anderton et al. | | |
| 9,392,365 B1 | 7/2016 | Yang | | |
| 9,473,863 B2 | 10/2016 | Nicolet et al. | | |
| 9,653,060 B1 | 5/2017 | Hilmes et al. | | |
| 9,672,821 B2 | 6/2017 | Krishnaswamy et al. | | |
| 2004/0057574 A1* | 3/2004 | Faller | H04M 9/082 | 379/387.01 |
| 2007/0242834 A1 | 10/2007 | Coutinho et al. | | |
| 2008/0027722 A1* | 1/2008 | Haulick | G10L 21/0208 | 704/226 |
| 2009/0043580 A1* | 2/2009 | Mozer | G10L 13/00 | 704/251 |
| 2009/0046868 A1 | 2/2009 | Engle et al. | | |
| 2009/0089054 A1* | 4/2009 | Wang | H04M 9/082 | 704/233 |
| 2009/0323982 A1* | 12/2009 | Solbach | H04R 3/005 | 381/94.3 |
| 2011/0033056 A1* | 2/2011 | Johnson | H03F 1/26 | 381/58 |
| 2012/0027218 A1* | 2/2012 | Every | G10L 21/0208 | 381/66 |
| 2012/0245933 A1* | 9/2012 | Flaks | G10L 21/0208 | 704/233 |
| 2013/0121498 A1* | 5/2013 | Giesbrecht | H04M 9/082 | 381/66 |
| 2013/0262101 A1* | 10/2013 | Srinivasan | G10L 21/0208 | 704/226 |
| 2013/0322639 A1* | 12/2013 | Cleve | H04R 3/02 | 381/66 |
| 2013/0332157 A1* | 12/2013 | Iyengar | G10L 15/20 | 704/233 |
| 2014/0012573 A1* | 1/2014 | Hung | G06F 1/3215 | 704/233 |
| 2014/0016794 A1* | 1/2014 | Lu | H04R 3/02 | 381/66 |
| 2014/0037100 A1* | 2/2014 | Giesbrecht | G10K 11/002 | 381/71.8 |
| 2014/0056435 A1* | 2/2014 | Kjems | G10L 15/20 | 381/66 |
| 2014/0114665 A1* | 4/2014 | Murgia | G10L 21/0216 | 704/275 |
| 2014/0135078 A1* | 5/2014 | Nigam | H03G 3/00 | 455/570 |
| 2014/0141724 A1* | 5/2014 | Liu | H04R 1/1083 | 455/63.1 |
| 2014/0148224 A1* | 5/2014 | Truong | H04M 9/085 | 455/557 |
| 2014/0170979 A1 | 6/2014 | Singhar | | |
| 2014/0172421 A1* | 6/2014 | Liu | H04R 1/1083 | 704/227 |
| 2014/0286497 A1* | 9/2014 | Thyssen | H04R 3/005 | 381/66 |
| 2014/0314241 A1* | 10/2014 | Penhune | G10K 11/178 | 381/71.1 |
| 2015/0112672 A1* | 4/2015 | Giacobello | G10L 21/0208 | 704/233 |
| 2015/0180536 A1* | 6/2015 | Zhang | H04B 3/23 | 381/66 |
| 2015/0215699 A1* | 7/2015 | Carlsson | H04R 3/02 | 381/71.8 |
| 2015/0243272 A1* | 8/2015 | Ozluturk | G10K 11/175 | 381/71.6 |
| 2015/0350395 A1* | 12/2015 | Jiang | H04R 3/005 | 455/570 |
| 2016/0111091 A1 | 4/2016 | Bakish | | |
| 2016/0150337 A1* | 5/2016 | Nandy | H04R 3/02 | 381/66 |
| 2016/0196833 A1* | 7/2016 | Godsill | G10L 21/0208 | 704/226 |
| 2016/0314782 A1 | 10/2016 | Klimanis | | |
| 2017/0004828 A1 | 1/2017 | Lee et al. | | |

OTHER PUBLICATIONS

Vacher, M. "The Sweet-Home Speech and Multimodal Corpus for Home Automation Interaction," Laboratoire d'Informatique de Grenoble, pp. 4499-4506; 7 pages.

International Search Report for International Application No. PCT/US18/32119 dated Aug. 1, 2018; 2 pages.

Written Opinion of the International Searching Authority for International Application No. PCT/US18/32119 dated Aug. 1, 2018; 6 pages.

* cited by examiner

SYSTEMS AND METHODS FOR REMOVING INTERFERENCE FOR AUDIO PATTERN RECOGNITION

RELATED APPLICATIONS

This application claims the priority benefit of U.S. Provisional Application No. 62/515,712, filed Jun. 6, 2017, which is incorporated herein by reference in its entirety.

TECHNICAL FIELD

The subject matter relates to the field of connectivity solutions. More specifically, but not by way of limitation, the subject matter discloses techniques for facilitating audio pattern recognition.

BACKGROUND

Audio pattern recognition typically involves an audio processing device receiving a predetermined audio pattern (e.g. by microphone) and performing audio pattern recognition, either locally or remotely, to match the predetermined audio pattern with corresponding meaning. The environment of the audio processing device may not only include the source of the predetermined audio pattern but may also include sources of interfering audio input. The interfering audio input, when received as sound waves at the microphone of the audio processing device, combines with the sound waves of the predetermined audio pattern, making pattern recognition a technical challenge.

BRIEF DESCRIPTION OF THE DRAWINGS

Some embodiments are illustrated by way of example and not limitation in the figures of the accompanying drawings in which.

DETAILED DESCRIPTION

Figure 1:
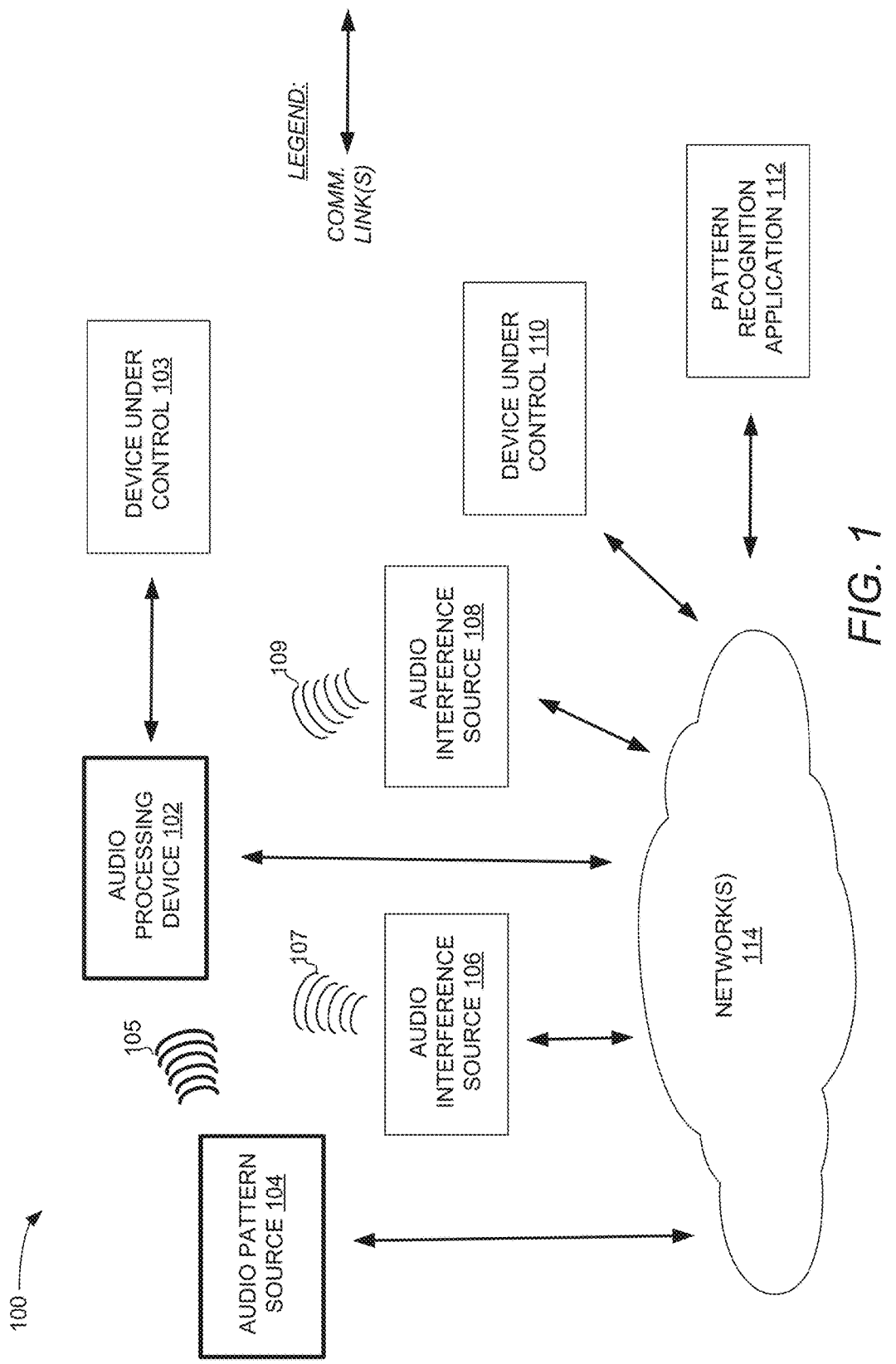
FIG. 1 is a block diagram illustrating an audio processing device communicatively coupled to other devices through one or more networks, in accordance with various embodiments.

Systems and methods for audio pattern recognition are described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

A connected device that has an ability to sense audio may be used as an audio processing device to facilitate local and/or remote audio pattern recognition, in accordance with embodiments described herein. For example, a smart phone has interfaces to connect to remote computing devices (e.g., over a Personal Area Networks (PANs), Local Area Networks (LANs), the Internet, and/or other network types) and has a microphone to sense audio (e.g., voice commands). Another example of an audio processing device is a voice controlled hub (VCH) that can control devices over a network (e.g., Bluetooth or Wi-Fi) responsive to voice commands. The VCH may be set up to control devices including, without limitation, white goods, thermostats, lighting, media devices, and/or applications running on a computing device. In embodiments, the VCH receives user voice commands via microphone, facilitates voice recognition, and instructs a connected device to perform a corresponding action (e.g., turn on a light switch, play music, change a television channel, perform an Internet search). Facilitating voice recognition may include recognizing the speech locally or having the speech recognized by a remote speech recognition application. As such, the VCH can offload resources of connected devices from having to recognize speech.

For audio processing devices that facilitate local or remote audio pattern recognition, interfering audio from sources in the environment (e.g., televisions, speakers, or other environmental noise) is not typically useful, when mixed with the audio pattern to be recognized. Indeed, a speech recognition application's (e.g., Automatic Speech Recognition (ASR)) operations for resolving the audio pattern of a mixed signal may be more power consuming, more time consuming, less consistent and less accurate compared to the case where only the audio pattern is presented to the speech recognition application.

In embodiments, interfering audio output by an environmental audio source to the microphone of an audio processing device is also provided (e.g., by the environmental audio source) as audio data to the audio processing device over a network. The audio processing device then uses the shared audio data to attenuate the interfering audio that is mixed in with the desired audio pattern presented to the microphone. As a result, the audio processing device so can present presented an estimate of the desired audio pattern to the speech recognition application.

Returning to the VCH example, a microphone array of the VCH can receive both a voice command of a human user and speaker sounds generated by a remote speaker system. In turn, the microphone array provides an audio input signal including a voice command component and a speaker sound component. The VCH also uses its radio frequency (RF) transceiver to receive, from the remote speaker system over one or more radio frequency channels, stream data corresponding to the speaker sounds. The processing system may use a packet loss concealer to conceal packets of the stream data that are unavailable for use.

In embodiments, a processing system of the VCH uses noise cancelling to distinguish between the voice command component of the audio input signal and the speaker sound component of the audio input signal. In an embodiment, an adaptive filter may estimate the speaker sound component using the corresponding stream data, and compare (e.g., mathematically) the estimated stream data with the audio input signal to generate an estimated voice command component.

In embodiments, the processing system uses a memory system of the VCH to buffer the audio input signal so that the VCH can synchronize a timing of the estimated stream data with a timing of the audio input signal. Synchronization allows the adaptive filter to accurately compare the estimated stream data with the audio input signal in the generation of the estimated voice command component. In embodiments, the VCH can control when it should receive the stream data and when it should not, depending on various conditions including but not limited to voice activity, network congestion, power consumption, and/or transmission time. For example, the processing system may first detect an indication of activity (e.g., voice activation) of the VCH and responsively request and receive the stream data from the speaker system. After the processing system detects an indication of inactivity (e.g., an absence of voice input), the VCH may responsively request that the speaker system stop transmitting the stream data.

Embodiments described herein can improve user experience by speeding up the voice recognition process, increasing recognition rates (e.g., understanding a greater percentage of voice commands), and improving the accuracy of recognition, while allowing users to continue using their connected media devices. Compared to prior techniques, embodiments can reduce and/or offload power and resource consumption associated with recognizing speech since interfering audio signals are removed from input to the speech recognition application. These and/or similar performance improvements extend to any connected device that uses the systems and methods to facilitate audio pattern recognition described herein. For example, any device (e.g., in a peer-to-peer (P2P) network) can detect connected media devices and/or request transmission of audio from other devices currently playing interfering audio. These and other embodiments are described in further detail herein.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram 100 illustrating an audio processing device 102 communicatively coupled to other devices through one or more networks 114, in accordance with various embodiments. The audio processing device 102 is to facilitate audio pattern recognition and may control a device or application based on a recognized audio pattern. The audio processing device 102 is shown to receive sound waves 105 from the audio pattern source 104 and sound waves 107 and 109 from the audio interference sources 106 and 108, respectively. The audio processing device may itself emit audio interference (not shown) (e.g., through speakers).

The audio processing device 102 is also shown to interact with network(s) 114 through communication link(s). To facilitate pattern recognition, the audio processing device 102 provides noise cancellation to remove some or all of the audio interference using corresponding audio data received from audio interference sources 106 and 108 over the networks(s) 114 or generated internally. In an embodiment, noise cancellation may be implemented using Independent Component Analysis (ICA) in which incoming signals (e.g., from a microphone) are separated by source (e.g., signals from the audio pattern source and the audio interference sources) then the audio data is compared with the separated signals to determine which should be removed to be left with an estimated audio pattern. Noise cancellation in other embodiments may utilize adaptive filters, neural networks, or any techniques known in the art that may be used to attenuate non-target components of a signal. In some embodiments, the audio processing device 102 may be coupled with a device under control 103 (e.g., a local device or application) that it can control based on recognized audio patterns.

The audio pattern source 104 is to provide the sound waves 105 that correspond to a recognizable audio pattern. In some embodiments, the audio pattern source 104 may interact with the network(s) 114 over communication link(s). In embodiments, an audio pattern is a predetermined audio pattern and/or an audio pattern that is recognizable by a pattern recognition application associated with the audio processing device 102. The audio pattern source 104 may be animate (e.g., human) or an inanimate object (e.g., a machine).

Audio interference sources 106 and 108 are sources of the sound waves 107 and 109, respectively, that interfere with recognition of the audio patterns corresponding to the sound waves 105. The audio interference sources 106 and 108 are shown to interact with the network(s) 114 over communication link(s). Audio interference sources 106 and 108 may provide to the audio processing device 102 through the network(s) 114, audio data corresponding to the audio interference. Audio interference sources may include loudspeakers, televisions, video games, industrial sources of noise, or any other noise source whose sound output is or can be digitized and provided to the audio processing device 102 via the network(s) 114.

The device under control 110 is shown to be coupled to the network(s) 114 via the link(s). Devices under control 110 and 103 may include any device with a function that can be initiated responsive to audio pattern recognition facilitated by the audio processing device 102. Example devices under control include white goods, thermostats, lighting, automated blinds, automated door locks, automotive controls, windows, industrial controls and actuators. As used herein, devices under control may include any logic, firmware, or software application run by the device under control 110.

Pattern recognition application 112 operates to recognize audio patterns and associate the recognized audio patterns with a corresponding meaning. The pattern recognition application may reside on a computing device(s) coupled to the network(s) 114 over the link(s) and use or be implemented using processors, memory, circuitry, arithmetic logic, software, algorithms, and data structures to organize and process attributes of audible sound including pitch, volume, tone, repeating or rhythmic sounds and/or language sounds such as words, phrases, and the like. In an embodiment, pattern recognition application 112 includes an ASR, which identifies predetermined audio patterns and associates them with one another (e.g., using a data structure) and/or with corresponding meaning. Audio patterns recognizable by the pattern recognition application 112 may facilitate, for example and not limitation, music recognition, song recognition, voice recognition, and speech recognition.

Network(s) 114 may include one more types of wired and/or wireless networks for communicatively coupling the network nodes of FIG. 1 to one another. For example, and not limitation, network(s) may include a wireless local area network (WLAN) (e.g., Wi-Fi, 802.11 compliant), PANs (e.g., Bluetooth SIG standard or Zigbee, IEEE 802.15.4 compliant), and the Internet. In an embodiment, the audio processing device 102 is communicatively coupled to the pattern recognition application 112 through Wi-Fi and the Internet. The audio processing device 102 may be communicatively coupled to the audio interference sources 106 and 108 and to the device under control 110 through Bluetooth and/or Wi-Fi.

Figure 2:
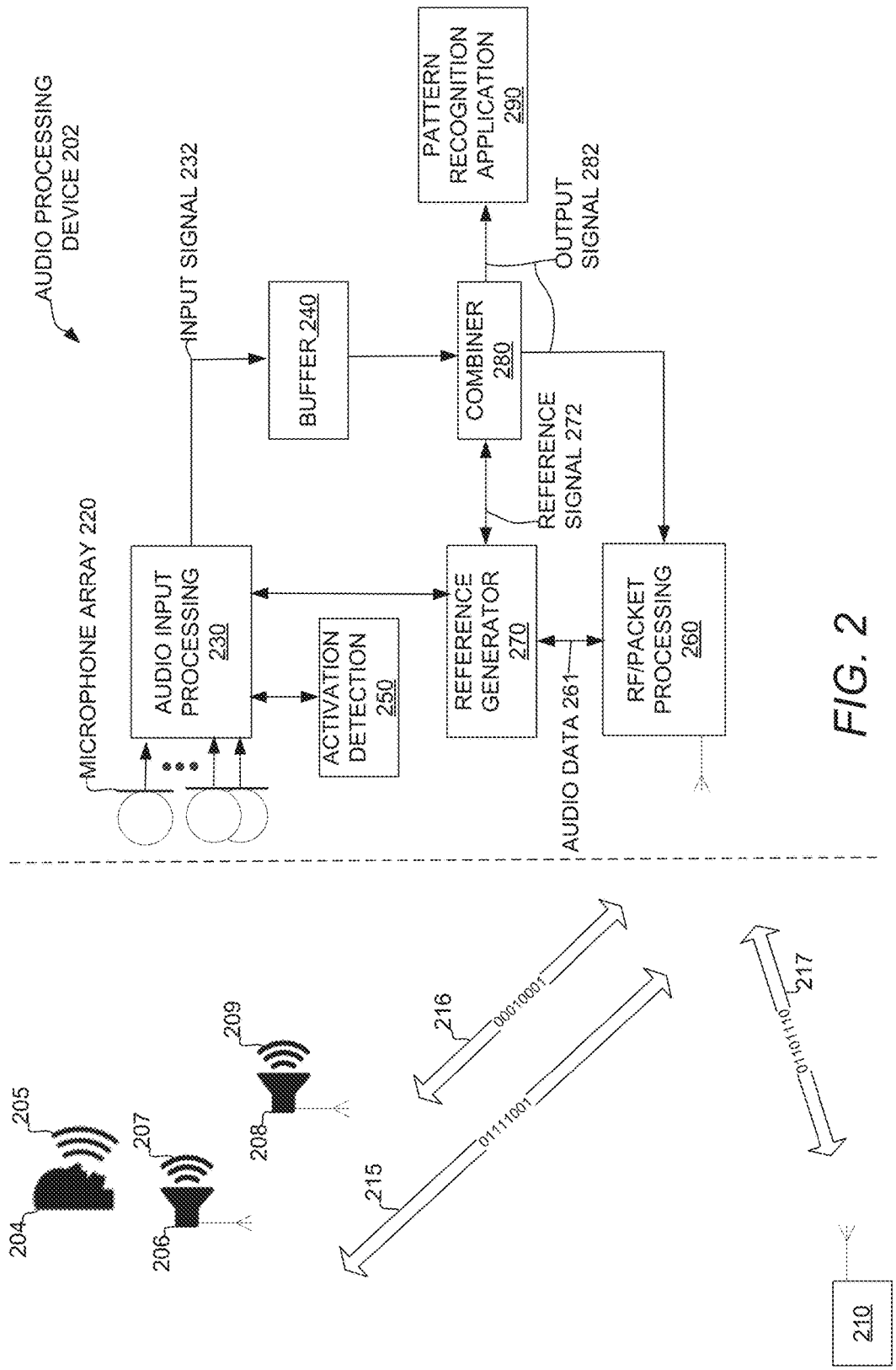
FIG. 2 is a block diagram illustrating interactions of an audio processing device, in accordance with embodiments.

FIG. 2 is a block diagram illustrating interactions of an audio processing device 202, in accordance with embodiments. The audio processing device 202 is shown to include various interactive functional blocks. Each functional block may be implemented using hardware (e.g., circuitry), instructions (e.g., software and/or firmware), or a combination of hardware and instructions.

The microphone array 220 is to receive sound waves 205 of a human speaker's 204 voice command and/or the interfering sound waves 207 and 209 that are output from the speaker systems 206 and 208, respectively. Each microphone of the microphone array 220 includes a mechanism (e.g., including a diaphragm) to convert the energy of sound waves into an electronic signal. When the sound waves 205, 207, and 209 are received during a common period, the electronic signal includes components that correspond to the voice command and audio interference. In some embodiments, one or more microphones of the array may be a digital microphone.

Audio input processing 230 includes circuitry to process and analyze the electronic audio signal received from the microphone array 220. In embodiments, audio input processing 230 provides analog to digital conversion to digitize the electronic audio signals. Once digitized, audio input processing 230 may provide signal processing (e.g., demodulation, mixing, filtering) to analyze or manipulate attributes of the audio inputs (e.g., phase, wavelength, frequency). Audio input processing 230 may isolate audio components (e.g., using beamforming) or determine distance and or position information associated with one or more audio sources (e.g., using techniques such as time distance of arrival (TDOA) and/or angle of arrival (AoA)). In some embodiments, audio input processing 230 may provide noise cancellation (e.g., of background noise) and/or estimation and cancellation of noise components using one or more adaptive filters. Once such additional processing, if any, is complete, audio input processing 230 may provide a resulting input signal 232 (e.g., one input signal for each microphone of the microphone array 220) to the combiner 280 (e.g., through the buffer 240).

Activation detection 250 is to detect an indication to start facilitating pattern recognition (e.g., an active mode) and/or an indication to stop facilitating pattern recognition (e.g., an inactive mode). Facilitating pattern recognition may include receiving audio data from a source of interference. In some embodiments, an activity, inactivity, behavior, or condition of a human, device, or network may provide the indication. For example, a user may provide the indication through touch input to an interface (not shown) (e.g., touchscreen or mechanical button), by making a predetermined sound, gesture, gaze, or eye contact. Activation detection 250 may detect the indication by recognizing a keyword uttered by a user or by recognizing the user's voice. In some embodiments, the indication may be a time out indicating a lack of voice activity, user activity, or device activity. The indication may be provided by hardware or software based on a timer, power consumption, network conditions (e.g., congestion), or any other internal or external device or network conditions. In embodiments, activation detection 250 may report detection to other components and/or remote devices and/or initiate a mode change responsive to detecting the indication.

RF/packet processing 260 is to provide network interface(s), process network packets, implement codecs, de/compress audio, and/or provide any other analog or digital packet processing. In an embodiment, RF/packet processing 260 includes an RF transceiver to wirelessly transmit and receive packets. In embodiments, RF/packet processing 260 communicates with the speaker system 206, the speaker system 208, and a device under control 210 via the links 215, 216, and 217, respectively.

For example, RF/packet processing may receive from the speaker systems 206 and 208 audio data corresponding to the interfering sound waves 207 and 209 received at the microphone array 220. In embodiments, RF/packet processing 260 can provide packet loss concealment to estimate and conceal portions of missing audio data due to lost or corrupted packets. RF/packet processing 260 may also include circuitry to analyze and process attributes of RF signals (e.g., phase, frequency, amplitude, signal strength) to estimate location and/or distance of transmitting devices relative to the audio processing device 202. RF/packet processing 260 may inspect packet contents to determine characteristics, status, and capabilities associated with transmitting devices such as time stamps, location, speaker specifications, audio quality, and volume. In embodiments, RF/packet processing 260 provides received audio data 261 with any associated information to the reference generator 270 for processing.

The audio processing device of FIG. 2 is an embodiment that provides noise cancellation using the reference generator 270 and the combiner 280. Other noise cancellation techniques known in the art may be utilized without departing from the inventive subject matter. In this embodiment, noise is cancelled on input signal 232 (e.g., a single channel), generated by the audio input processing 230, which includes a combination of input from each microphone in the array. In other embodiments, noise cancellation may be provided for each microphone signal between the microphone array 220 and audio input processing 230, prior to generation of the input signal 232.

The reference generator 270 is to generate a reference signal 272, based on the audio data 261, which is an estimate of one or more interference components in the input signal 232. In an embodiment, the reference signal 272 is a combination of audio data 261 from different sources of interference. To provide an estimation of interference components, the reference generator 270 may use information provided by audio input processing 230 and/or by RF/packet processing 260. For example, reference generator 270 may use attributes of the input signal, distance and/or angle of an interference source relative to the audio processing device 202, and/or attributes of the audio data 261 to estimate the interference components that result from the interfering sound waves 207 and 209 at the microphone array 220. In embodiments, the reference generator 270 may use adaptive filtering implemented in firmware on a Digital Signal Processor (DSP), an application processor, dedicated hardware, or a combination of both (e.g., hardware accelerators). An embodiment of the reference generator 270 is described with respect to FIG. 3.

The combiner 280 is to generate an output signal 282 that is based on a comparison of the reference signal 272 with the input signal 232. In embodiments, the buffer 240, which may buffer the input signal 232, is used to synchronize a timing of the input signal 232 with a timing of the reference signal 272 prior to the combination. Example buffer timing is described in more detail with respect to FIG. 5.

In an embodiment, the combiner 280 removes all or a portion of the interference components from the input signal 232 to produce an output signal 282 that represents and estimation of the voice command component of the input signal 232. For example, the output signal 282 may be a difference between the input signal 232 and the reference signal 272 calculated by the combiner 280. Alternatively or additionally, the combiner 280 may use addition, multiplication, division, or other mathematical operations and/or algorithms, alone or in combination, to generate the output signal 282.

The combiner 280 may provide the output signal 282 to the pattern recognition application 290. The pattern recognition application 290 need not reside within the audio processing device 202. In other embodiments all or a portion of the output signal 282 may be transmitted by RF/packet processing 260 to a remote audio processing application (e.g., residing on one or more computing devices coupled to the Internet) for voice recognition. The audio processing device 202 may then forward the voice command to the device under control 210 over the link 217 for completion of the corresponding action.

Figure 3:
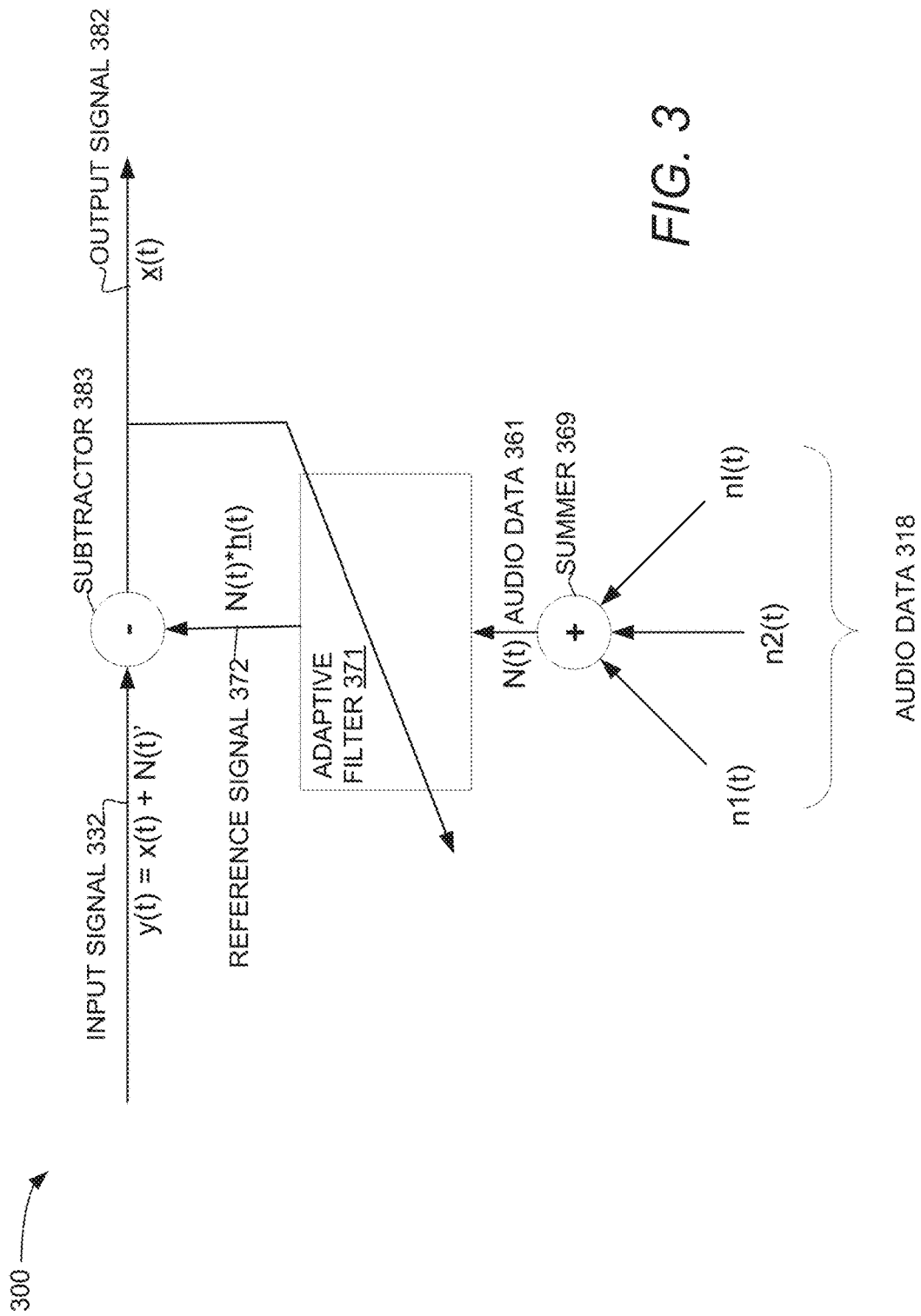
FIG. 3 is a block diagram illustrating aspects of a reference generator, in accordance with an embodiment.

FIG. 3 is a block diagram illustrating aspects of a reference generator 300, in accordance with an embodiment. In an embodiment, the summer 369 receives audio data 318 from a number, I, of audio interference sources n1($t$), n2($t$) . . . nI(t)) and combines the audio data 318 to generate audio data 361, N(t). The summer 369 may reside in RF/packet processing 260 of FIG. 2 and/or in the reference generator 270 of FIG. 2. The adaptive filter 371 receives the audio data 361, N(t) and outputs the reference signal 272 to the subtractor 383. Also provided to the subtractor 383 is the input signal 332, y(t). The subtractor 383 may reside in the reference generator 270 and/or the combiner 280 of FIG. 2. The input signal 332, y(t) may include a desired audio pattern component, x(t) and/or the audio interference components, N(t)' after having experienced modification during sound wave propagation from the audio interference sources. Thus, the input signal 332, y(t) can be expressed as:

$$y(t)=x(t)+N(t)' \qquad \text{Eq. 1.}$$

In an embodiment, the audio data 361, N(t) may represent the audio interference components without having experienced modification during sound wave propagation. The adaptive filter 371 estimates the modified audio interference components N(t)' using a convolution operation (e.g., represented by "*") on the audio data 361, N(t) and an estimated impulse response $\underline{h}$(t). For example, the adaptive filter 371 may derive the estimated impulse response, $\underline{h}$(t) of propagation through a loudspeaker, through a room, and to the microphone. The modified audio interference components N(t)' may be expressed as:

$$N(t)'=N(t)*\underline{h}(t) \qquad \text{Eq. 2.}$$

Thus, the output signal 282, $\underline{x}$(t) from the subtractor 383 is an estimate of the desired audio pattern component, x(t) given by:

$$\underline{x}(t)=x(t)+N(t)'-N(t)*\underline{h}(t) \qquad \text{Eq. 3.}$$

In some embodiments, processing logic of the audio processing device 202 (not shown) can evaluate the output signal using any voice activation detection algorithm (e.g., using neural networks techniques) known in the art to determine whether or not the input signal includes a useful component from a targeted source of the predetermined audio pattern. The processing logic may initiate or inhibit pattern recognition depending on the determination. For example, when the estimate of the desired audio pattern, $\underline{x}$(t) is less than a predetermined threshold value, the processing logic may determine that the input signal does not include a useful component from the targeted source. When the estimate of the desired audio pattern, $\underline{x}$(t) meets or exceeds the predetermined threshold value, the processing logic may determine that the input signal does include a useful component from the targeted source. In embodiments, the predetermined threshold value can be selected and stored in memory during a manufacturing process and/or determined dynamically based on operating conditions during runtime and stored in memory.

In an embodiment, operations of the summer 369, the adaptive filter 371, and/or the subtractor 383 are implemented in the frequency domain. Any adaptive filter technique known in the art may be used including the Normalized Least-Mean-Squares (NLMS) algorithm.

Figure 4:
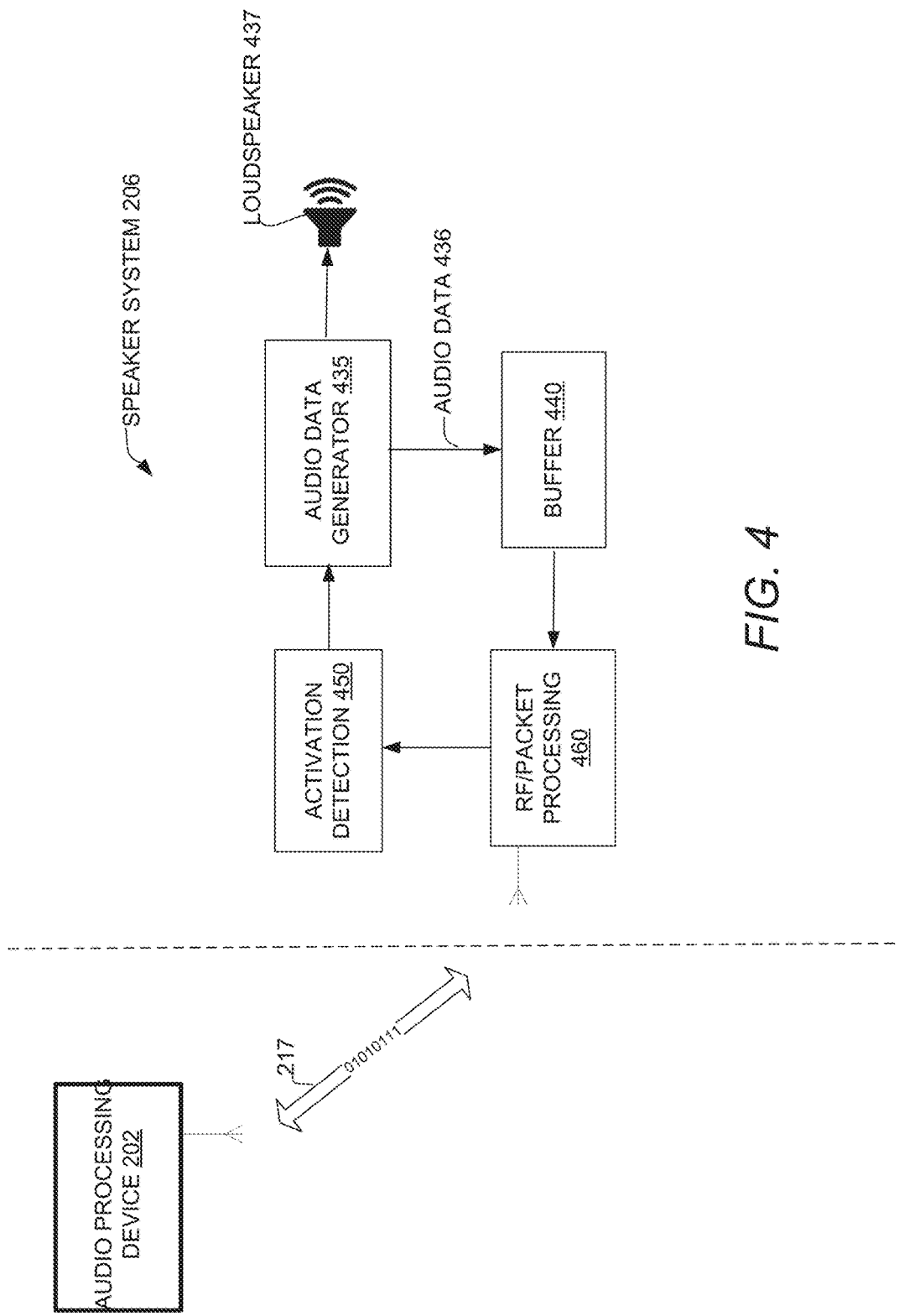
FIG. 4 is a block diagram illustrating interactions of speaker system, in accordance with embodiments.

FIG. 4 is a block diagram illustrating interactions of a speaker system 206, in accordance with embodiments. The speaker system 206 is shown to include various interactive functional blocks. Each functional block may be implemented using hardware (e.g., circuitry), instructions (e.g., software and/or firmware), or a combination of hardware and instructions.

In an embodiment, the speaker system 206 provides audio playback through the loudspeaker 437 and provides corresponding audio data 436 to the audio processing device 202 through RF/packet processing 460 and the link 217. RF/packet processing 460 provides a communication interface to one more networks and may be the same or similar to the RF/packet processing 260 described with respect to FIG. 2. The audio data generator 435 routes the audio data 436 for output by the loudspeaker 437 and for transmission to the audio processing device 202. The audio data generator 435 may reside in an audio routing block of the speaker system 206. In an embodiment, the speaker system 206 transmits audio data 436 to the audio processing device 202 whenever the speaker system 206 is playing back audio through the loudspeaker 437. In some embodiments, the speaker system 206 transmits the audio data 436 based on a request or other indication from the audio processing device 202 operating in a mode to facilitate pattern recognition.

Activation detection 450 is to detect indications of a mode in which the audio data 436 should be transmitted or a mode in which the audio data 436 should stop being transmitted to the audio processing device 202. In various embodiments, the indications may be same or similar to those described with respect to the activation detection 250 of FIG. 2. The buffer 240 is used to store audio data 436 for the case that the audio processing device 202 requests audio data 436 corresponding to audio interference that has already been played out of the loudspeaker 437. Example buffer requirements associated with modes of operation are described below with respect to FIG. 5.

Figure 5:
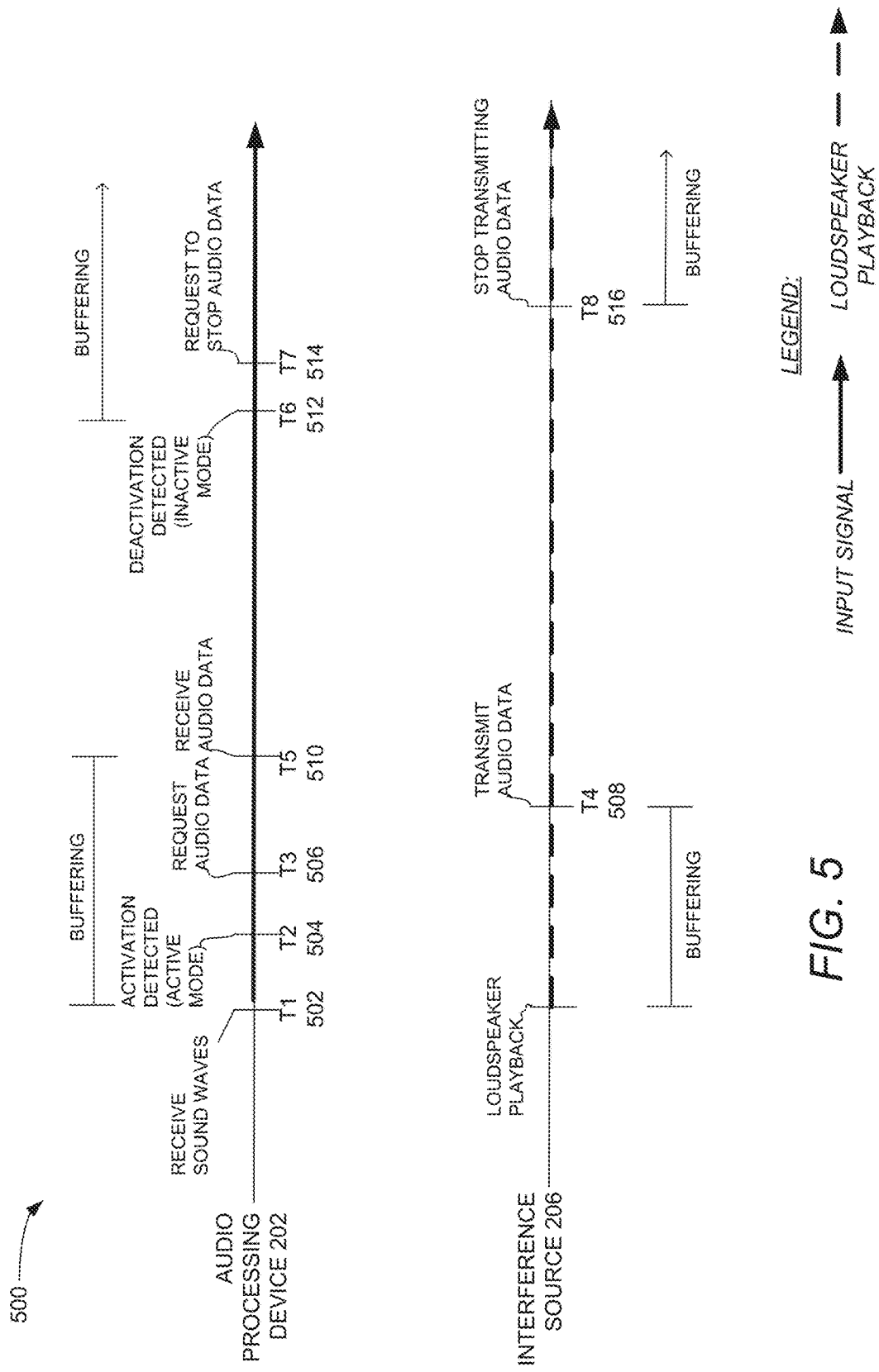
FIG. 5 is a timing diagram illustrating device operational modes, in accordance with embodiments.

FIG. 5 is a timing diagram 500, illustrating device operational modes, in accordance with embodiments. At T1 502, the audio processing device 202 receives sound waves at its microphones. The audio processing device 202 begins generating the input signal (e.g., input signal 232 of FIG. 2.) and buffering the input signal so that it may be used to facilitate pattern recognition when the audio processing device 202 enters into an activate mode. Also at T1 502, the speaker system 206 is outputting audio through its loudspeaker 437 and begins buffering the corresponding audio data (e.g., the audio data 436 of FIG. 4).

At T2 504, the audio processing device 202 detects an indication to activate before responsively requesting audio data from the interference source at T3 506. In an embodiment, the audio processing device 202 may specify in the request, a start time that the requested audio data should start from. At T4 508, the speaker system 206 begins transmitting the audio data that it has been buffering. For example, although the speaker system 206 may have been buffering since T1 502, the speaker system 206 may only transmit the audio data buffered since activation detection at T2 504. After T4 508, the speaker system 206 may, in some embodiments, stream the audio data without buffering. At T5 510, the audio processing device 202 receives the audio data and may continue buffering the input signal until the reference signal has been generated and is ready for combination with the input signal that it has been buffering.

In an embodiment, the input signal buffered from about T2 504 (e.g., activation) to about T5 510 (receive audio data) is used for the transition to active mode. After using this initial buffering, the audio processing device 202 may continue buffering (not shown), as needed, to support synchronization of the input signal with the reference signal.

At T6 512, the audio processing device 202 is deactivated before it responsively requests at T7 514 that the interference source stop transmitting the audio data. In preparation for another activation, the audio processing device 202 may begin buffering again at T6 512 and the speaker systems 206 may stop transmitting audio data and begin buffering again at T8 516.

Figure 6:
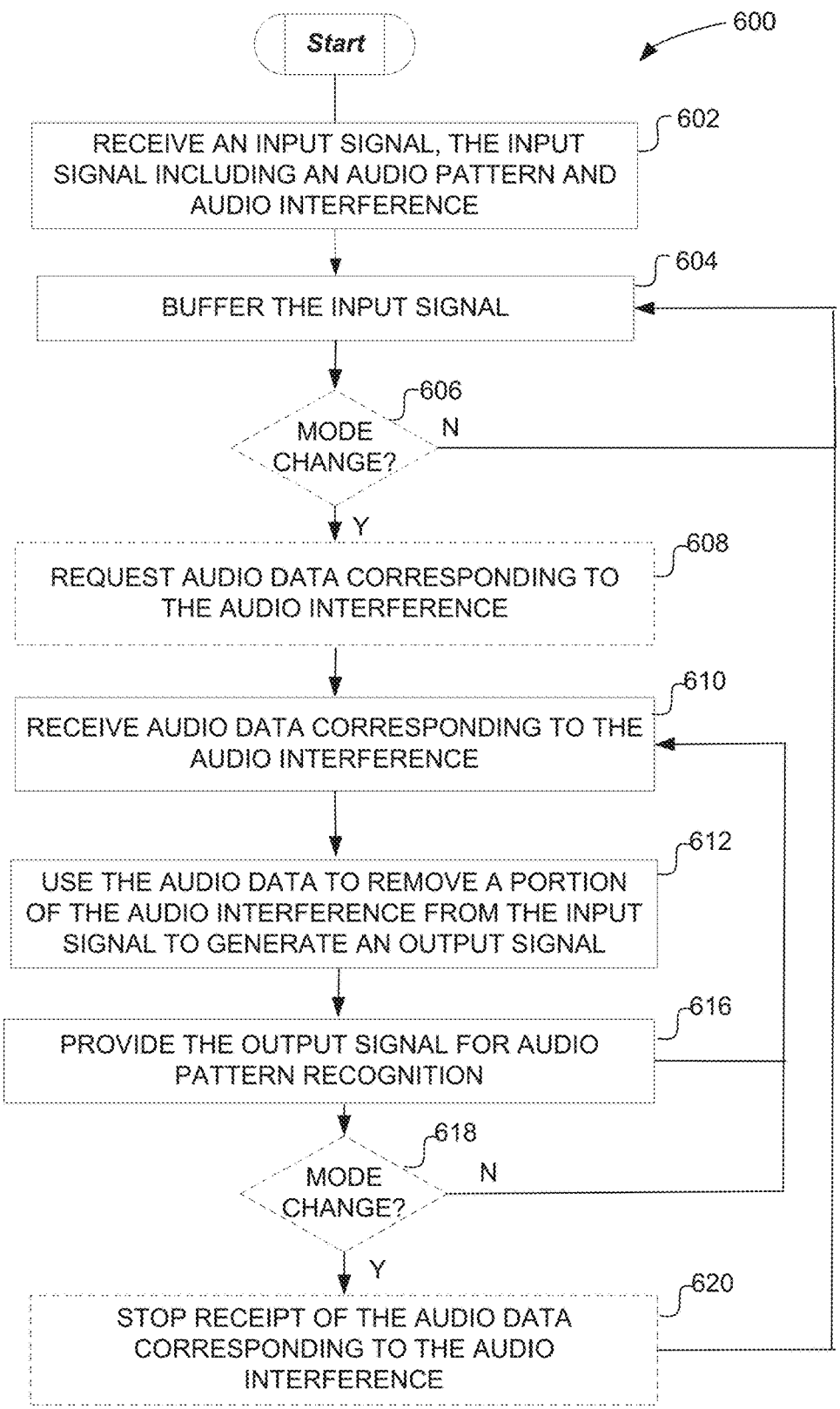
FIG. 6 is flow diagram illustrating a method of facilitating audio pattern recognition, in accordance with embodiments.

FIG. 6 is a flow diagram illustrating a method 600 for facilitating audio pattern recognition, in accordance with embodiments. The method 600 can be performed by processing logic comprising hardware (circuitry, dedicated logic, etc.), software (such as is run on a general-purpose computing system or a dedicated machine), firmware (embedded software), or any combination thereof. In various embodiments, the method 600 can be performed by the audio processing device of FIG. 2.

For example, at block 602, audio input processing 230 provides to buffer 240 an input signal 232 that includes a predetermined or otherwise recognizable audio pattern (e.g., a voice command component) and audio interference (e.g., an interference component). The buffer 240 buffers the input signal 232 before providing the input signal 232 to the combiner 280 for use at block 612. The buffer 240 may store the input signal 232 as described above with respect to FIG. 5. In some embodiments, the buffer stores the input signal 232 for a period long enough to support synchronization of a timing of the input signal with a timing of the reference signal, such that at least a portion of the buffered input signal 232 is used in the generating of the output signal 282.

In some embodiments, the audio processing device 202 or another device can control whether the audio processing device 202 receives audio data from interference sources. An interference source or another device may also control whether the interference source transmits audio data to the audio processing device 202. Audio processing device 202 may receive audio data in an active mode and not receive audio data in an inactive mode. For example, transmission of audio data from interference sources may be controlled based on levels of network congestion and/or network activity. Some embodiments include blocks 606 and 618 to check for a mode change and blocks 608 and 620 to start or stop receipt of audio data in response to detecting a mode change.

For example, at block 606 activation detection 250 may determine whether the audio processing device 202 has received an indication to enter into a mode of actively preparing and providing the output signal 282 for audio pattern recognition (e.g., an active mode) or to remain in a current mode of operation (e.g., an inactive mode). If activation detection 250 determines that operation should continue in an inactive mode, the buffer 240, at block 604, continues to buffer the input signal 232. If activation detection 250 determines that operation should change to the active mode, at block 608, activation detection 250 causes RF/packet processing 260 to request audio data corresponding to the audio interference.

At block 610, RF/packet processing 260 receives the audio data corresponding to the audio interference and forwards it to the reference generator 270. In embodiments, the audio data may be requested and received from any source of audio interference components that is communicatively coupled to the audio processing device 202.

At block 612, the reference generator 270 and the combiner 280 use the audio data to remove interference components from the input signal and generate an output signal. For example, the reference generator generates a reference signal 272 based on the audio data 261 and provides the reference signal 272 to the combiner 280. As described with respect to FIG. 3, the summer 369 can combine audio data from multiple sources of interference. The combiner 280 of FIG. 2 generates an output signal 282 based on the reference signal 272 and the input signal 232. For example, the subtractor 383 of FIG. 3 generates the output signal 382 by subtracting the reference signal 372 from the input signal 332. At block 616, the combiner 280 provides the output signal 282 for audio pattern recognition.

In some embodiments, processing logic of the audio processing device 202 can provide voice activity detection to determine whether the input signal 232 includes an audio pattern component that is intended to be recognized based on the value of the resulting output signal 282. For example, the processing logic can distinguish whether the input signal includes a voice command or just audio input from a connected device using any appropriate voice activity algorithm (e.g., using neural networks techniques) known in the art. For example, when a value of the output signal 282 is below a predetermined threshold value, processing logic may determine that values of the input signal 232 are the same or similar to the values of the reference signal 272 and/or that the input signal 232 includes little or no voice command component from a user, and thus, need not proceed to a voice recognition application. When the output signal 382 meets or exceeds the predetermined threshold value, the processing logic may determine that values of the input signal 232 are not the same or similar to the values of the reference signal 272 and/or that the input signal 232 includes a sufficient amount of voice command component from the user, and thus, should proceed to the voice recognition application.

At block 618, if activation detection 250 determines that operation should change from the active mode to the inactive mode, at block 620, activation detection 250 causes the audio processing device 202 to stop receipt of the audio data corresponding to the audio interference. In some embodiments, activation detection 250 may cause RF/packet processing 260 to request that speaker systems 206 and 208 stop transmitting audio data. Alternatively or additionally, activation detection 250 may cause RF/packet processing 260 to block or reject any incoming audio data.

Figure 7:
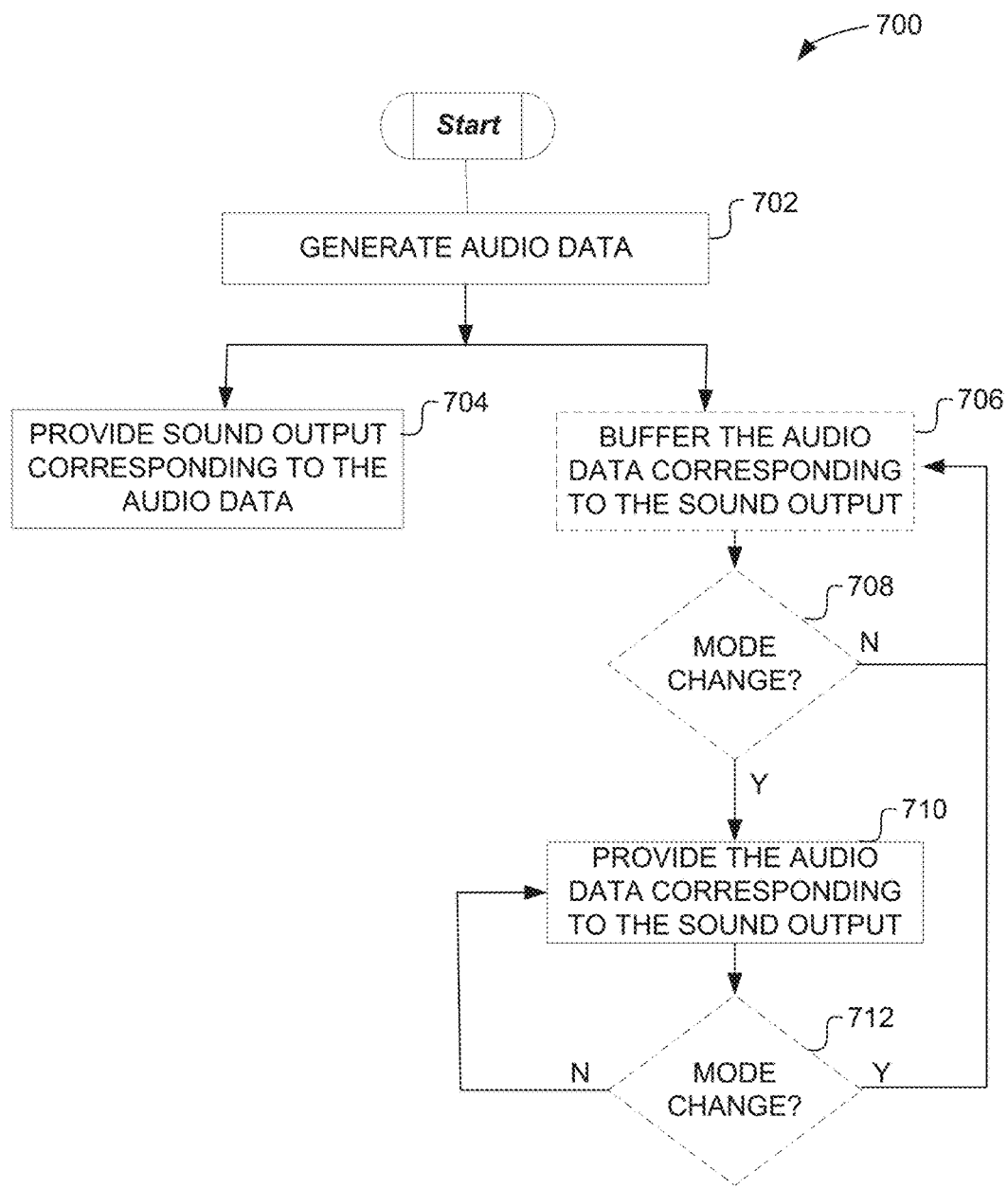
FIG. 7 is a flow diagram illustrating a method for providing sound output and corresponding audio data, in accordance with embodiments.

FIG. 7 is a flow diagram illustrating a method 700 for providing sound output and corresponding audio data, in accordance with an embodiment. The method 700 can be performed by processing logic comprising hardware (circuitry, dedicated logic, etc.), software (such as is run on a general-purpose computing system or a dedicated machine), firmware (embedded software), or any combination thereof. In various embodiments, the method 700 can be performed by the audio processing device of FIG. 4.

At block 702, the audio data generator generates audio data 436 and provides it to the loudspeaker 437 for playback at block 704. Concurrently, but depending of the current mode of operation, the audio data generator 435 may either provide the audio data 436 to the buffer 440 at block 706 (e.g. in an inactive mode), or bypass buffering, and provide the audio data 436 to audio processing device 202 at block 710 (e.g., in an active mode).

If the audio data is buffered at block 706, the method may proceed to block 708, where activation detection 450 determines whether the speaker system 206 has received an indication that the audio processing device 202 has entered into an active mode or is maintaining operation in an inactive mode. In some embodiments, the mode change indicator is a request or instructions from the audio processing device 202. If activation detection 450 detects an inactive mode, the buffer 440 continues to buffer the audio data at block 606. If activation detection 450 detects a change from the inactive mode to the active mode, operation proceeds to block 710 where the speaker system 206 provides the audio data 436 to the audio processing device 202.

At block 712, activation detection 450 monitors for a change from active mode to inactive mode. If there is no change in mode, the speaker system 206 continues to provide the audio data as in block 710. If the mode changes to inactive, at block 710, the speaker system 206 stops providing the audio data 436 to the audio processing device 202 and instead provides it to the buffer 440 for buffering as in block 706.

Figure 8:
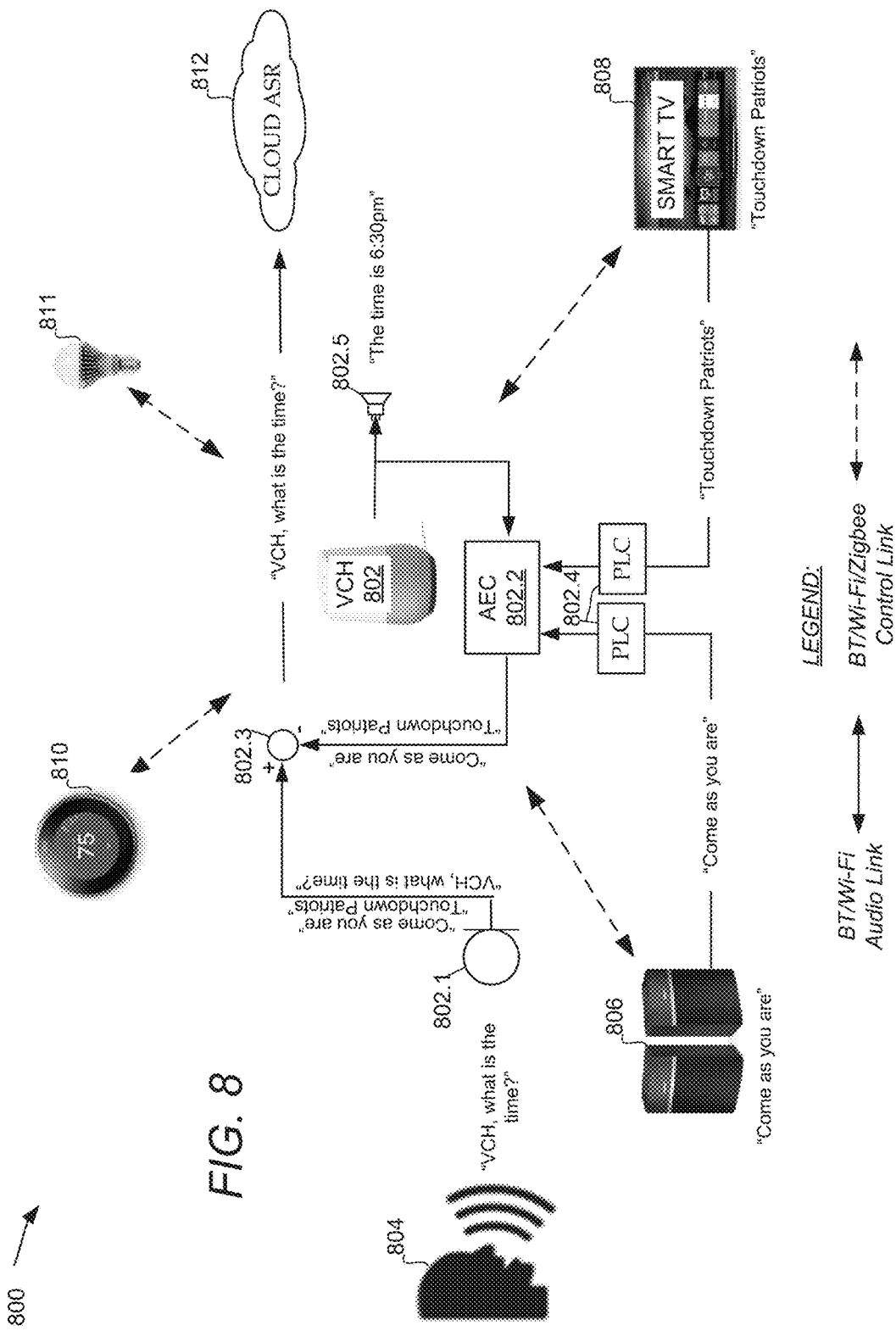
FIG. 8 is a block diagram illustrating an IoT system including a Voice Controlled Hub (VCH), in accordance with embodiments.

FIG. 8 is a block diagram illustrating an IoT system 800 including a VCH 802, in accordance with embodiments. In an embodiment, smart devices in a room or zone are controlled by the VCH 802, which is connected to cloud ASR 812. The VCH 802 is placed in a zone to listen to anyone in that zone, detect and interpret commands, and perform the requested actions. For example, the VCH 802 may control a connected light switch 811, thermostat 810, television 808, and speakers 806 within the zone.

By centrally locating the voice control in the VCH 802, connected devices can be controlled by the VCH 802 through a control link. This may eliminate the need to implement a voice interface on each connected device and can save significant cost for device manufacturers, both in terms of providing the hardware capability and development effort. The VCH 802 has access to the Internet and can perform cloud-based ASR instead of local ASR, thus gaining access to advanced ASR capability, processing power, and improving performance and the user experience.

The audio output from the television 808 and the speakers 806 picked up by the VCH 802 implementing embodiment, avoid the interference with the voice control operation, reduction in speech recognition rate and harm to user experience suffered by previous technologies. For example, suppose the target human talker 804 utters the command "VCH, what is the time?" to the VCH 802. At the same time, the speakers 806 are playing a song with the lyrics "Come as you are," while television 808 is showing the Superbowl with audio "Touchdown Patriots." The microphone 802.1 in the VCH 802 captures all the audio signals and passes a mixed audio signal to the Acoustic Echo Cancellation block (AEC) 802.2.

The AEC 802.2 may prevent or remove echo signals, or any unwanted signal, from an audio input signal. Echo cancellation may involve recognizing re-appearance of an originally transmitted signal that re-appears, with some delay, in the transmitted or received signal. Once the echo is recognized, it can be removed by subtracting it from the transmitted or received signal. This technique is generally implemented digitally using a digital signal processor or software, although it can be implemented in analog circuits as well.

The speakers 806 also transmit to the VCH 802, "Come as you are" via the Bluetooth or Wi-Fi audio links and the television 808 transmits to the VCH 802, "Touchdown Patriots" via the Bluetooth or Wi-Fi audio links. The transfer of audio across wireless links will experience bit errors and packets loss, so a packet loss concealment (PLC) algorithm 802.4 may be applied upon reception of the signals at the VCH 802 and before being used as reference by the AEC 802.2. In an embodiment, the audio signal driving the VCH speaker 802.5 may also be used as a reference by the AEC 802.2.

These signals are used as reference input to the AEC 802.2 which subtracts their estimate at 802.3 from the mixed signal captured by the microphone 802.1. The result is the interference-removed target signal "VCH, what is the time". This signal is passed to the Cloud ASR 812, enabling accurate recognition resulting in the response from the VCH speaker 802.5, "The time is 6:30 pm".

In some embodiments, the connected devices transmit audio to the VCH 802 whenever audio is being played out, whether or not commands are being uttered by a user. Depending on the wireless environment and capabilities of the VCH 802, this may cause network congestion. If transmitting audio via the audio links continuously is a concern for power consumption and/or congestion or other reason, the VCH 802 may signal via a control link to the connected devices when to transmit the, based on detection of a speech signal or keyword phrase.

The connected devices may store a certain amount of played out audio in a buffer. When the VCH 802 detects active speech from a user, it uses the control link to notify the connected devices to commence with audio transfer. Alternatively or additionally, the VCH 802 may use the control link to disable or lower volume on the connected devices that are playing audio when the VCH 802 detects voice and/or the keyword phrase. The VCH 802 can also employ a buffer of the incoming audio from the microphone 802.3, enabling it to properly align the AEC 802.2 with the captured audio. In an embodiment the buffering requirement is based on the voice activity detection delay and the time required to signal the remote devices and begin receiving the reference signals.

Embodiment described herein can be applied to a P2P connected scenario where device A wants to interact with a user and perform voice recognition but device B is playing audio. Device A may advertise a request on the control channel to find out if any connected devices are currently playing audio. Responsive to the request, an audio link is established and device B sends its audio to device A, which can then perform cancellation of the device B audio that it picks up as interference when the user is trying to use voice recognition.

Figure 9:
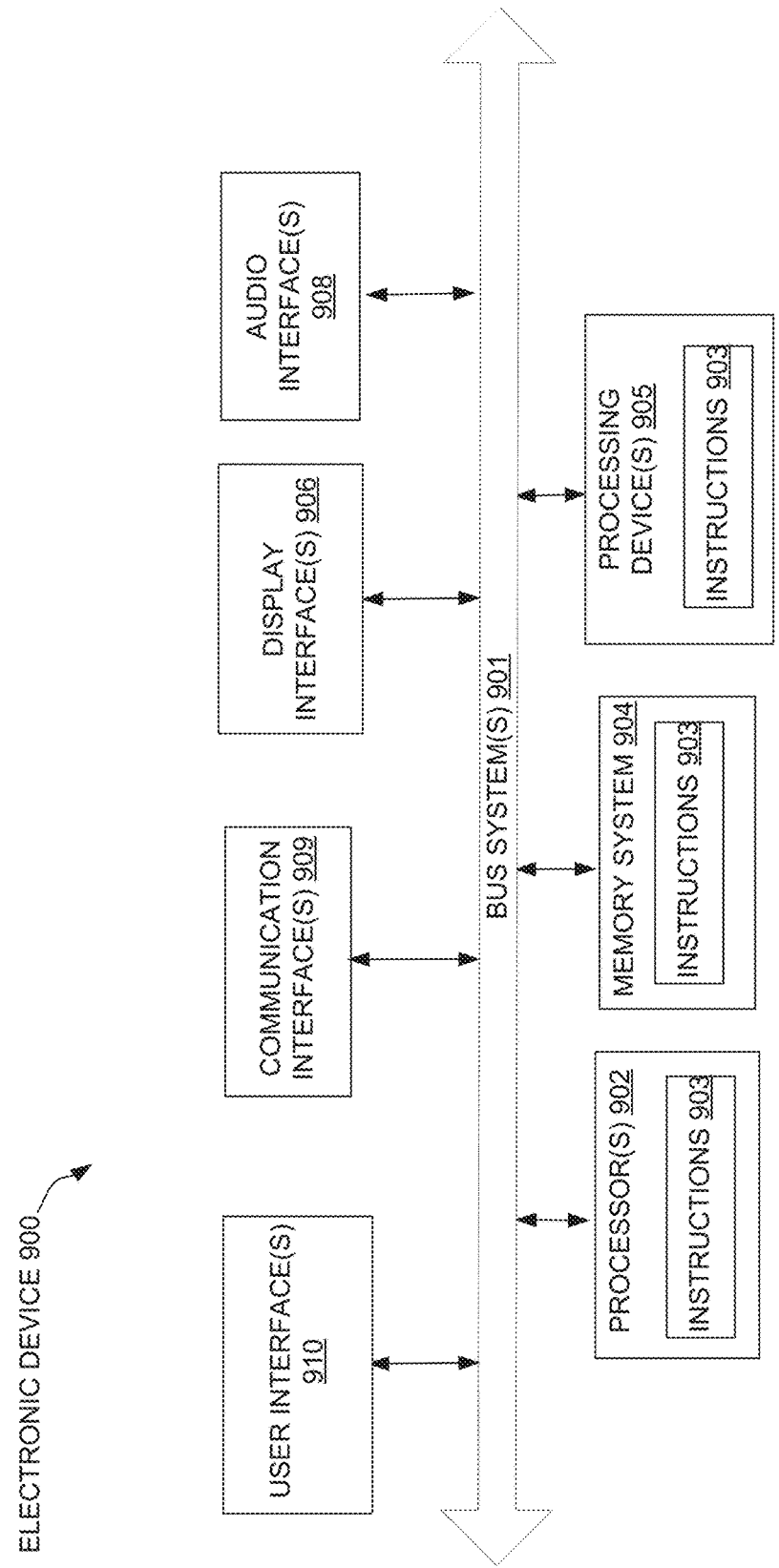
FIG. 9 is a block diagram illustrating an electronic device, in accordance with embodiments.

FIG. 9 is a block diagram illustrating an electronic device 900, in accordance with embodiments. The electronic device 900 may fully or partially include and/or operate the example embodiments of the audio processing device 102, the audio pattern source 104, the audio interference sources 106 and 108, the devices under control 103 and 110, and/or the pattern recognition application 112 of FIG. 1. The electronic device 900 may be in the form of a computer system within which sets of instructions may be executed to cause the electronic device 900 to perform any one or more of the methodologies discussed herein. The electronic device 900 may operate as a standalone device or may be connected (e.g., networked) to other machines. In a networked deployment, the electronic device 900 may operate in the capacity of a server or a client machine in server-client network environment, or as a peer machine in a P2P (or distributed) network environment.

The electronic device 900 may be an Internet of Things (IoT) device, a server computer, a client computer, a personal computer (PC), a tablet, a set-top box (STB), a VCH, a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 900 is illustrated, the term "device" shall also be taken to include any collection of machines that individually or jointly execute a set (or multiple sets) of instructions to perform any one or more of the methodologies discussed herein.

The electronic device 900 is shown to include a processor(s) 902. In embodiments, the electronic device 900 and/or processors(s) 902 may include processing device(s) 905 such as a System on a Chip processing device, developed by Cypress Semiconductor Corporation, San Jose, Calif. Alternatively, the electronic device 900 may include one or more other processing devices known by those of ordinary skill in the art, such as a microprocessor or central processing unit, an application processor, a host controller, a controller, special-purpose processor, DSP, an application specific integrated circuit (ASIC), a field programmable gate array (FPGA), or the like. Bus system 901 may include a communication block (not shown) to communicate with an internal or external component, such as an embedded controller or an application processor, via communication interface(s) 909 and/or bus system 901.

Components of the electronic device 900 may reside on a common carrier substrate such as, for example, an integrated circuit (IC) die substrate, a multi-chip module substrate, or the like. Alternatively, components of the electronic device 900 may be one or more separate integrated circuits and/or discrete components.

The memory system 904 may include volatile memory and/or non-volatile memory which may communicate with one another via the bus system 901. The memory system 904 may include, for example, random access memory (RAM) and program flash. RAM may be static RAM (SRAM), and program flash may be a non-volatile storage, which may be used to store firmware (e.g., control algorithms executable by processor(s) 902 to implement operations described herein). The memory system 904 may include instructions 903 that when executed perform the methods described herein. Portions of the memory system 904 may be dynamically allocated to provide caching, buffering, and/or other memory based functionalities.

The memory system 904 may include a drive unit providing a machine-readable medium on which may be stored one or more sets of instructions 903 (e.g., software) embodying any one or more of the methodologies or functions described herein. The instructions 903 may also reside, completely or at least partially, within the other memory devices of the memory system 904 and/or within the processor(s) 902 during execution thereof by the electronic device 900, which in some embodiments, constitutes machine-readable media. The instructions 903 may further be transmitted or received over a network via the communication interface(s) 909.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 900 is further shown to include display interface(s) 906 (e.g., a liquid crystal display (LCD), touchscreen, a cathode ray tube (CRT), and software and hardware support for display technologies), audio interface(s) 908 (e.g., microphones, speakers and software and hardware support for microphone input/output and speaker input/output). The electronic device 900 is also shown to include user interface(s) 910 (e.g., keyboard, buttons, switches, touchpad, touchscreens, and software and hardware support for user interfaces).

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
providing an input signal based on sound waves received by one or more microphones, the input signal including a voice command component and one or more interference components;
buffering the input signal;
detecting an indication to receive audio data;
receiving the audio data via one or more computer networks, the audio data corresponding to the one or more interference components, wherein the receiving of the audio data is responsive to the detecting of the indication, and wherein the buffering of the input signal includes buffering the input signal at least until the receiving of the audio data;
using the audio data, removing at least a portion of the one or more interference components from the input signal to generate an output signal; and
providing the output signal, as an estimate of the voice command component, for speech recognition.

2. The method of claim 1, wherein the using of the audio data includes generating a reference signal by combining first audio data of the audio data with second audio data of the audio data, wherein the first audio data corresponds to a first interference component of the one or more interference components, and the second audio data corresponds to a second interference component of the one or more interference components, wherein removing at least the portion of the one or more interference components from the input signal comprises subtracting the reference signal from the input signal.

3. The method of claim 2, wherein removing at least the portion of the one or more interference components from the input signal includes combining at least portion of the audio data with at least a portion of the input signal.

4. The method of claim 1, wherein removing at least the portion of the one or more interference components from the input signal includes comparing at least portion of the audio data with at least a portion of the input signal.

5. The method of claim 1, further comprising using at least a portion of the buffered input signal to synchronize a timing of audio data with a timing of the input signal.

6. The method of claim 1, further comprising detecting an indication to stop receiving the audio data and responsively stopping receipt of the audio data, and starting the buffering of the input signal.

7. The method of claim 1, wherein receiving the audio data via the one or more computer networks includes receiving first audio data of the audio data wirelessly over one or more radio frequency channels.

8. The method of claim 1, wherein the receiving of the audio data comprises receiving first audio data of the audio data from a source of a first interference component of the one or more interference components, and receiving second audio data of the audio data from a source of a second interference component of the one or more interference components.

9. The method of claim 1, wherein the providing of the output signal for speech recognition comprises transmitting the output signal to a speech recognition application communicatively coupled to a first computer network of the one or more computer networks.

10. A voice controlled hub comprising:
a microphone array configured to capture a voice command of a human user and speaker sound generated by a remote speaker system and provide an audio input signal comprising a Voice command component and a speaker sound component;
a radio frequency transceiver configured to receive, from the remote speaker system, stream data including audio data that was used by the remote speaker system to generate the speaker sound;
a buffer configured to buffer the audio input signal at least until e radio frequency transceiver receives the stream data from the remote speaker system; and
a processing system configured to use a noise canceller to distinguish between the voice command component of the audio input signal and the speaker sound component of the audio input signal, wherein the noise canceller is configured to use the stream data to remove at least a portion of the speaker sound component from the audio input signal to generate an estimated voice command component.

11. The voice controlled hub of claim 10, further comprising a packet loss concealer, wherein the processing system is configured to use the packet loss concealer to conceal packets of the stream data that are unavailable for use by the noise canceller.

12. The voice controlled hub of claim 10, further comprising a memory system, wherein the processing system is configured to use the memory system to buffer the audio input signal to synchronize a timing of the stream data with a timing of the audio input signal.

13. The voice controlled hub of claim 12, wherein the processing system is configured to detect a voice activation of the voice controlled hub and responsively use the radio frequency transceiver to request the stream data from the remote speaker system.

14. The voice controlled hub of claim 10, wherein the radio frequency transceiver is configured to transmit the estimated voice command component to a remote automatic speech recognition application and receive voice command data corresponding to the estimated voice command, and wherein the processing system is configured to initiate a device function based on the voice command data.

* * * * *